United States Patent [19]
Lee et al.

[11] Patent Number: 5,231,889
[45] Date of Patent: Aug. 3, 1993

[54] WRIST UNIT FOR INDUSTRIAL ROBOT

[75] Inventors: Jong-Suk Lee, Kyonggi; Kyung-Sul Jang, Pusan, both of Rep. of Korea

[73] Assignee: Samsung Electronics Co., Ltd., Suweon, Rep. of Korea

[21] Appl. No.: 827,338

[22] Filed: Jan. 30, 1992

[30] Foreign Application Priority Data

Jan. 31, 1991 [KR] Rep. of Korea .................. 91-1681

[51] Int. Cl.⁵ .................... B25J 17/02; G05G 11/00
[52] U.S. Cl. .................... 74/479 R; 901/15; 901/23; 901/25; 901/29
[58] Field of Search .................. 74/479; 901/15, 23, 901/28, 29, 25, 26

[56] References Cited

U.S. PATENT DOCUMENTS

| | | | |
|---|---|---|---|
| 4,685,861 | 8/1987 | Huetsch | 901/25 X |
| 4,949,586 | 8/1990 | Akagawa | 901/28 X |
| 4,991,456 | 2/1991 | Shibata et al. | 74/479 |
| 4,998,830 | 3/1991 | Tounai et al. | 74/479 X |
| 5,016,489 | 5/1991 | Yoda | 901/28 X |

FOREIGN PATENT DOCUMENTS 59-59392 4/1984 Japan.
1558666 4/1990 U.S.S.R. .................. 901/28

Primary Examiner—Allan D. Herrmann
Attorney, Agent, or Firm—Burns, Doane, Swecker & Mathis

[57] ABSTRACT

A wrist unit for an industrial robot includes an arm member with a motor installed therein and having a pair of integral guide portions. Holes are formed in respective guide portions, the holes being coaxial. A wrist member having receiving portions is disposed in a space formed between the guide portions. Two intermediate members are attached by fasteners to the wrist member and project into bearings mounted in the holes. A pair of cover members are fastened on opposite sides of the guide portions in order to retain the bearings.

6 Claims, 2 Drawing Sheets

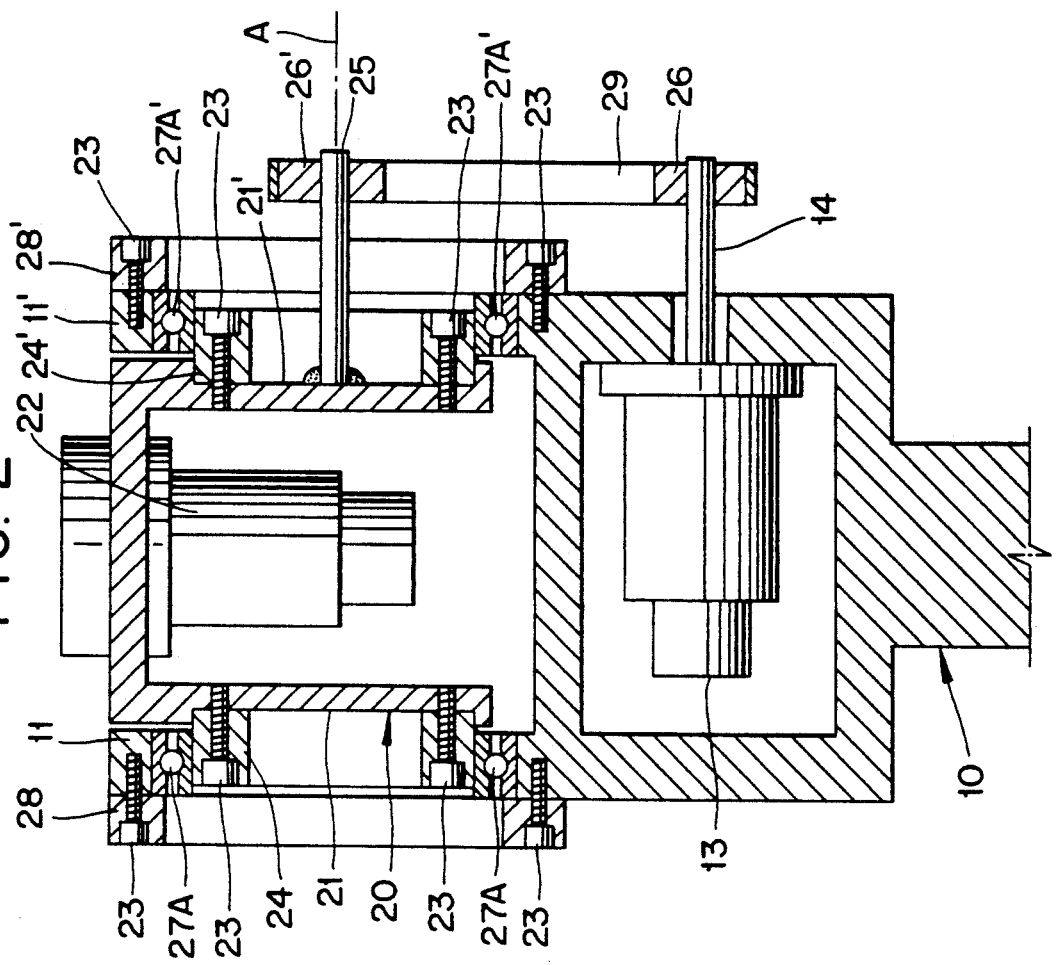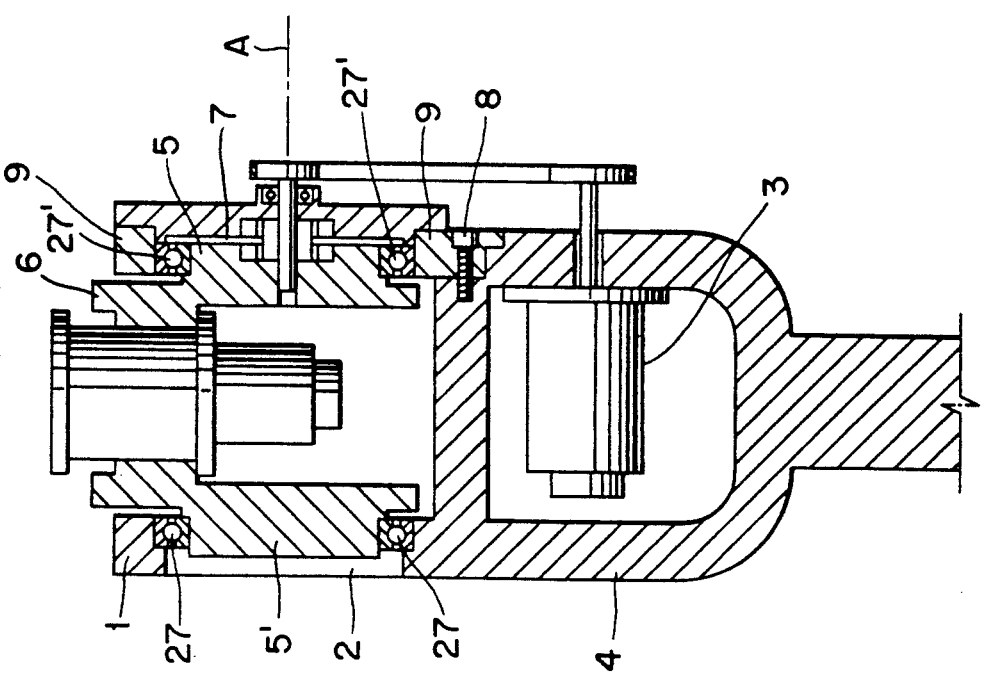

WRIST UNIT FOR INDUSTRIAL ROBOT

FIELD OF THE INVENTION

The present invention relates to a wrist unit for industrial robot, in which the wrist member can be conveniently assembled to the end of the arm member, thereby improving the productivity.

BACKGROUND OF THE INVENTION

In the conventional industrial robots, a motor is installed in an arm member, and a wrist member is connected through a hinge means to the outer end of the wrist member, in such a manner that the wrist member should be able to pivot by receiving power from the motor. When the wrist member performs pivoting movements by receiving the driving power from the motor, there are generated frictional abrasions due to the existence of the hinge means, with the result that it is difficult to maintain the concentricity. Further, when assembling the wrist, strong impacts are imposed on the joint portion, and therefore, efficient pivoting movements of the wrist can not be expected.

In order to overcome the above described disadvantage, there is proposed a wrist unit for industrial robot as shown in FIG. 1. As shown in this drawing, the wrist unit includes: an arm member 4 with an integrally formed guide portion 1 projected therefrom, with a hole 2 formed through a side of the upper portion, and with a portion formed thereon for receiving a motor 3; a wrist member 6 with a pair of projections 5 and 5' projected from the opposite sides thereof, and for performing pivoting movements about an axis A by receiving the driving power from the motor 3; and a side plate member 9 with a hole 7 formed for receiving the projection 5 of the wrist member 6, and secured on the other side of the upper portion of the arm member 4 by means of a bolt 8 to enable the wrist member 6 to perform pivoting movements without being dislodged. Further, bearings 27 and 27' are installed between the hole 2 of the guide portion 1 and the projection 5' of the wrist member 6, and between the hole 7 of the side plate member 9 and the projection 5 of the wrist member 6 respectively, so that the wrist member 6 should be able to perform pivoting movements in an efficient manner.

However, in the above described wrist unit, if the wrist member 6 is to perform pivoting movements in an efficient manner, the concentricity of the hole 2 of the guide section 1 and the hole 7 of the side plate member 9 has to be maintained above a certain precision. Therefore, when the wrist member 6 is assembled to the arm member 4 and the side plate member 9, first the side plate member 9 is secured to the arm member 4 by means of a bolt 8 and the like, and then, the holes 2 and 7 are formed simultaneously by machining the side plate member 9 and the guide portion 1. Then, in order to install the wrist member 6 having the projections 5 and 5', first the side plate member 9 has to be detached from the arm member 4 after the formation of the hole 7. Then the projection 5 of the wrist member 6 is inserted into the hole 2 of the guide portion 1, and then, the other projection 5' of the wrist member 6 is inserted into the hole 7 of the side plate member 9 after interposing a bearing 27' therebetween, thereby completing the assembling of the wrist member 6 into the arm member 4 and the side plate member 9.

That is, in the conventional wrist unit, the projections 5 and 5' are formed of one piece with the wrist member on the opposite sides of the wrist member 6, and the side plate member 9 has to be attached and detached before assembling the wrist member 6, with the result that the time required for the assembling is increased, thereby lowering the productivity. Further, the attachment and detachment of the side plate member 9 aggravates the concentricity of the holes 7 and 2, with the result that the pivoting function of the wrist member remains inaccurate as before.

In an attempt to overcome the above described disadvantages, Japanese Patent Laying-opening No. Sho-59-59392 proposes another wrist unit, and this wrist unit includes: a driving means supported by an arm; a first wrist arm with one end secured to a first revolution shaft (for transmitting the driving power); a second wrist arm with one end secured to a second revolution shaft (connected to the other end of the first wrist arm in a freely rotatable manner), and having a supporting portion in order to support a hand so as for the hand to be positioned at the same distance from the center of the second revolution shaft as the distance between the center of the first revolution shaft and the center of the second revolution shaft; a first revolution gear attached to the first revolution shaft in a rotatable manner; and a second revolution gear having a diameter equivalent to one half of that of the first revolution gear, with the first and second revolution gears being connected together.

However, in the above described wrist unit for industrial robot, the first revolution gear is attached to the base end of the first wrist arm in a rotatable manner, and the second revolution gear having a diameter of ½ of that of the first revolution shaft is also connected to the joining portion of the first wrist arm and the second wrist arm. Therefore it is possible to prevent the positional deviation when moving the hand, but the an excessive assembly time is required, and consequently, the productivity is reduced. Further, due to the deviation in the concentricity, the wrist member can not be moved in an accurate manner.

SUMMARY OF THE INVENTION

The present invention is intended to overcome the above described disadvantages of the conventional techniques.

Therefore, it is the object of the present invention to provide a wrist unit for an industrial robot, in which the, one-piece projections of the wrist member are eliminated, so that the wrist member can be joined to the arm member in an easy manner without using a side plate member, thereby reducing assembly time, improving the productivity, and assuring efficient and accurate pivoting movements of the wrist member.

In achieving the above object, the wrist unit for an industrial robot according to the present invention includes: an arm member having a lower portion for receiving a motor, and having integrally formed guide portions with holes formed in them; a wrist member having receiving portions on the opposite sides thereof, and for performing pivoting movements by receiving power through a power transmitting means from a motor; intermediate members each fitted into one of the receiving portions of the wrist member, and one of the holes of the guide portions; bearings installed between the intermediate members and the holes of the guide portions for the wrist member to be efficiently pivoted; and cover members fixedly secured on the opposite sides of the arm member to retain the bearings.

The guide portions which are integrally and uprightly formed on the arm member facilitates the assembling of the wrist member, so that the productivity should be improved. Further the concentricity of the holes of the guide portions is maintained at a high precision, so that the wrist member can perform pivoting movements efficiently and accurately.

BRIEF DESCRIPTION OF THE DRAWINGS

The above object and other advantages of the present invention will become more apparent by describing in detail the preferred embodiment of the present invention with reference to the attached drawings in which:

FIG. 1 is a sectional view showing a conventional wrist unit for an industrial robot;

FIG. 2 is a sectional view of a wrist unit for an industrial robot according to the present invention.

DESCRIPTION OF THE PREFERRED EMBODIMENT

Figure 3:
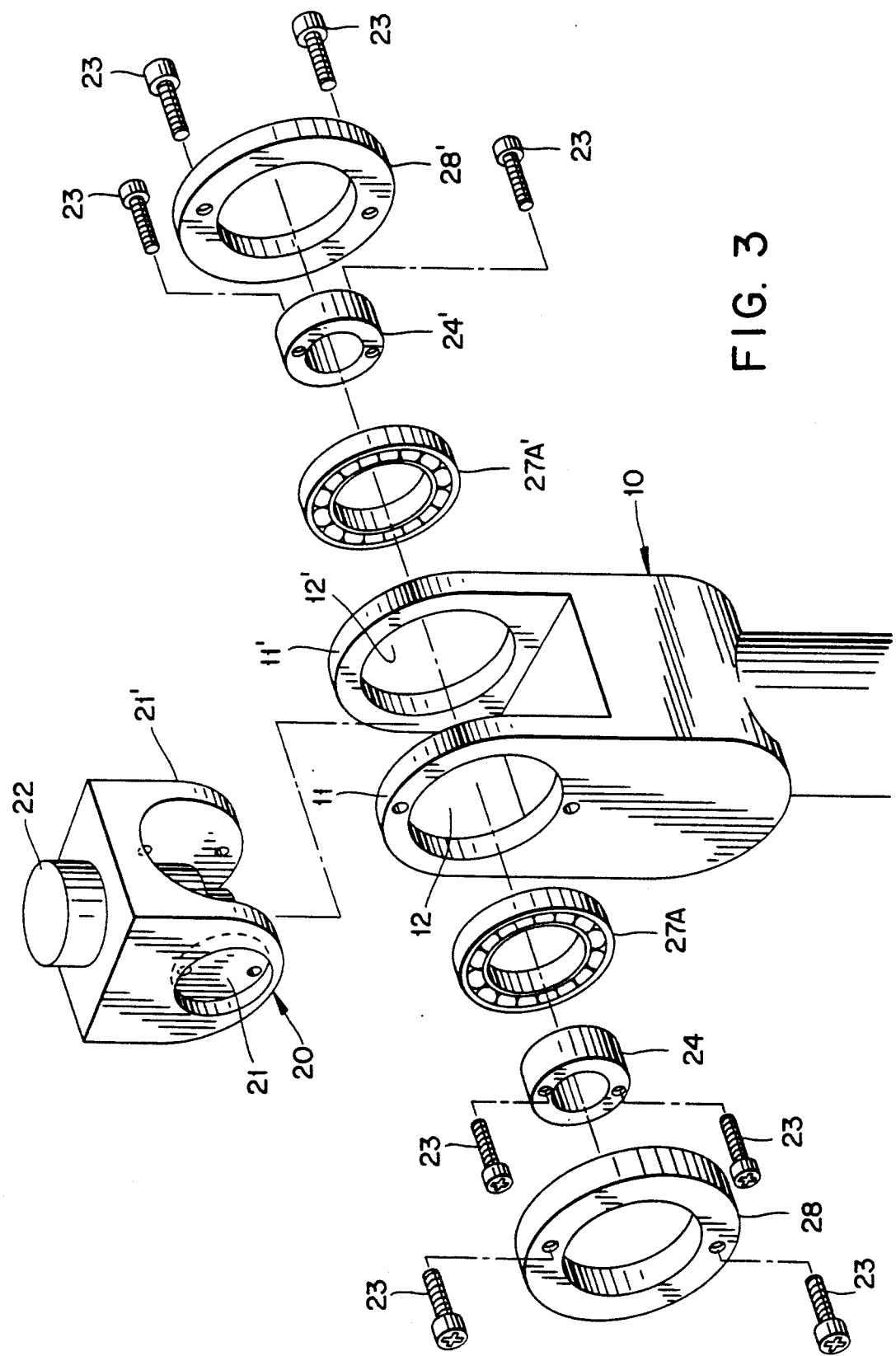
FIG. 3 is an exploded perspective view showing the wrist unit for industrial robot according to the present invention.

Referring to FIGS. 2 and 3, reference numeral 10 indicates an arm member, and, in the lower portion of this arm member 10, there is installed a motor 13 which is for pivoting a wrist member 20 which is to be described below. Guide portions 11 and 11, are integrally (i.e., of one piece with the arm member) and uprightly formed on the upper portion of the arm member, and the guide portions 11 and 11, are provided with laterally spaced circular holes 12 and 12' which are machined simultaneously so that the holes maintain a good concentricity or coaxial relationship.

At the right side of the motor 13 which is installed in the lower portion of the arm member 10, there is fixedly secured one end of a driving shaft 14, and this driving shaft 14 extends through the arm member 10 horizontally, while a pulley 14 is installed at the other end of the driving shaft 14.

Between the guide portions 11 and 11' which are formed on the upper portion of the arm member in an oppositely facing manner, there is inserted the wrist member 20, and this wrist member 20 is provided with receiving portions 21 and 21' on the opposite sides thereof, and with a motor 22 attached on the upper portion thereof in order to rotate a gripper (not shown). In cylindrical recesses of the receiving portions 21 and 21' of the wrist member 20, there are fitted intermediate members 24 and 24' as shown in FIG. 2, and these members 24 and 24' are fastened in the portions 21 and 21' by means of fastening bolts 23 and the like, while, at the same time, these intermediate members 24 and 24' are inserted into the holes 12 and 12' of the guide portions 11 and 11'. Further, between the intermediate members 24 and 24' and the holes 12 and 12' of the guide portions 11 and 11', there are fitted bearings 27A and 27'A, so that the wrist member 20 should be able to pivot in an efficient manner. Further, within the right side receiving portion 21' of the wrist member 20, there is fixedly secured a driven shaft 25 by welding, and a pulley 26' is fixedly attached on the end of the shaft 25. The pulley 26' is connected through a power transmitting means 29 such as a belt to a pulley 26 which is fixedly attached to the driving shaft 14 which is in turn driven by the motor 13, to pivot wrist member 20 about axis A.

A pair of ring-shaped cover members 28 and 28' are fastened on the opposite sides of the guide portions 11 and 11' of the arm member 10 by means of fastening bolts 23 and the like, so that the bearings 27A and 27'A should not depart from their positions.

The wrist unit of the present invention constituted as above will now be described as to its operation and effects.

As shown in FIGS. 2 and 3, if power is supplied by a control section (not shown) the motor 13 drive the driving shaft 14. The pulley 26 which is attached to the driving shaft 14 revolves the power transmitting means 29. The power transmitting means 29 transmits power to the wrist member 20, so that the wrist member 20 performs pivoting movements on the top of the arm member 10.

Since the arm member 10 is provided with a pair of guide portions 11 and 11' with holes 12 and 12' formed thereon, the wrist member 20 can be assembled to the arm member 10 in a convenient manner, with the result that assembly line is reduced thereby improving the productivity. Further, the concentricity of the holes 12 and 12' of the guide portions 11 and 11' of the arm member 10 can be maintained at the required precision, and therefore, the wrist member 20 can perform pivoting movements efficiently and accurately.

According to the present invention as described above, the wrist member can be assembled to the arm member in a convenient manner, and therefore, the productivity can be improved. Further, the wrist member is supported by the guide portions of the arm member in a secure and accurate manner, and therefore, the wrist member can perform pivoting movements in an efficient manner by the motor.

What is claimed is:

1. A wrist unit for an industrial robot, comprising:
   an arm member having first and second laterally spaced guide portions of one-piece construction with said arm, said guide portions having first and second holes arranged coaxially with respect to an axis;
   first and second rotary bearings mounted in said first and second holes, respectively, and arranged coaxially with respect to said axis;
   first and second ring-shaped cover members releasably secured by fasteners to laterally outer sides of respective guide portions, portions of said cover members radially overlapping respective ones of said bearings for axially retaining said bearing in said holes,
   a wrist assembly comprising:
      a receiving portion disposed within a space formed between said holes, and
      first and second intermediate members releasably secured to said receiving portion for rotation therewith and projecting laterally outwardly therefrom, said intermediate members being rotatably disposed within respective ones of said bearings for rotation about said axis; and
   a motor mounted on said arm and operably connected to said wrist assembly for rotating said wrist assembly about said axis.

2. A wrist unit according to claim 1, wherein said motor is mounted at a location spaced from said axis, and drive transmitting means including a driven shaft extending through one of said holes for connecting said motor to said wrist assembly.

3. A wrist unit according to claim 2, wherein said drive transmitting means includes a drive shaft connected to said motor and extending parallel to and spaced from said driven shaft.

4. A wrist unit according to claim 1, wherein said intermediate members are of cylindrical shape.

5. A wrist unit according to claim 1, wherein said fasteners connecting said cover members to said arm and connecting said intermediate members to said wrist member comprise bolts.

6. A wrist unit according to claim 1, wherein said motor is mounted at a location from said axis, and drive transmitting means including a driven shaft extending through one of said holes for connecting said motor to said wrist assembly, said drive transmitting means including a drive shaft connected to said motor and extending parallel to said driven shaft, said intermediate members being of cylindrical shape.

* * * * *